Patented Feb. 9, 1943

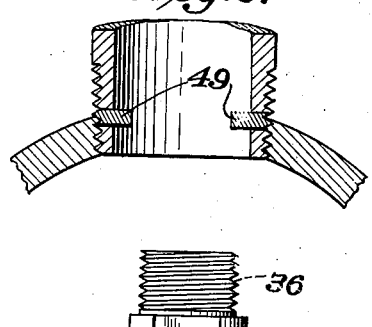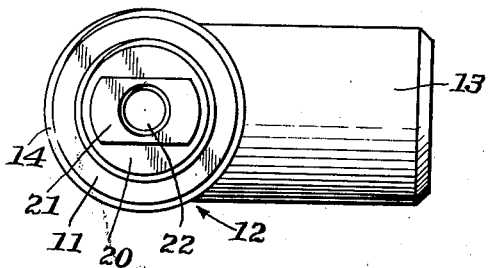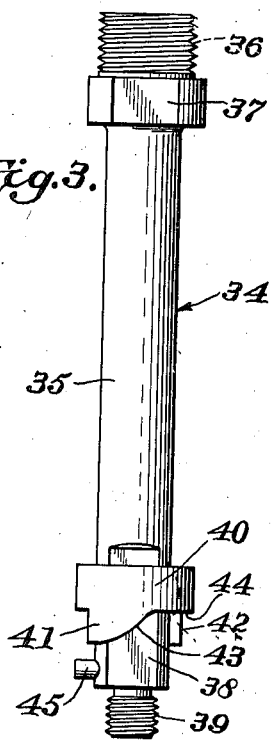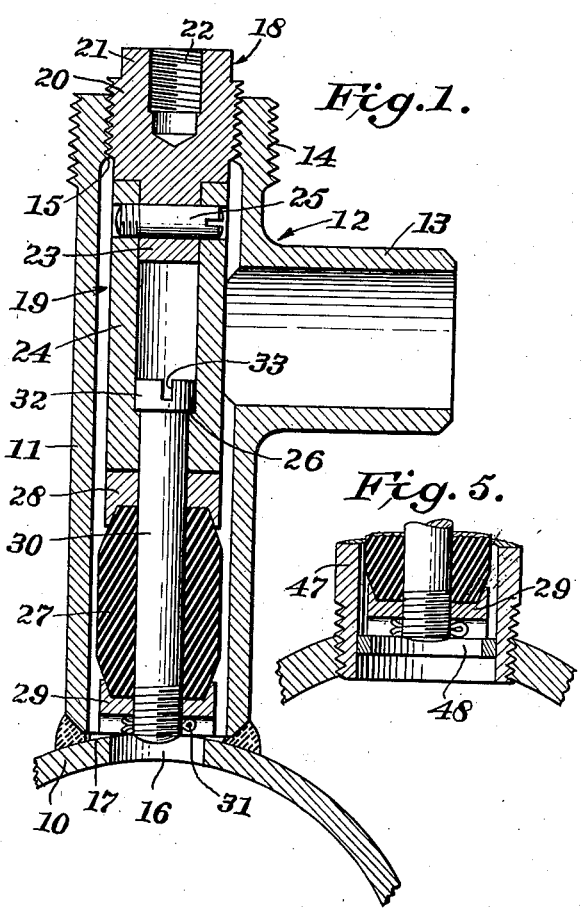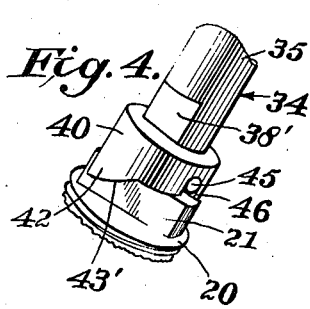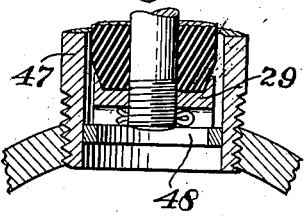

2,310,351

UNITED STATES PATENT OFFICE 2,310,351

STOPPER FOR PIPES

Walter J. Bowan and Elmer H. Fawley, Decatur, Ill., assignors to Mueller Co., Decatur, Ill., a corporation of Illinois Application February 12, 1941, Serial No. 378,684

6 Claims. (Cl. 138—89)

This invention relates particularly to stoppers capable of operative disposition in fittings such as a T interposed between a pressure main and a service line, for the purpose of cutting off the line for repairs, etc.

In the patent to Mueller, 1,996,345, granted April 2, 1935, there is disclosed apparatus for cutting off the service line, but this apparatus requires that the drilling machine, by which the plug is inserted in the main, be left in position as long as the service line is cut off, the machine being thus incapable of other use during this period. It is a principal purpose of the present invention to provide a stopper which may be applied by the drilling machine and which will permit the machine to be removed for other uses until the stopper is to be removed. The invention also relates to means for manipulating the stopper.

The invention is shown in illustrative embodiment in the accompanying drawing to which reference will now be made.

In the drawing:

Figure 1 is an axial section of the new stopper and a T, and a partial transverse section of a main to which the T is welded.

Figure 2 is a plan view of the T and stopper of Figure 1.

Figure 3 is an elevation of a tool utilized in the insertion of the stopper.

Figure 4 is an isometric view showing the associated portions of the tool and stopper.

Figure 5 is a partial view similar to that of Figure 1, but showing a threaded T modified for coaction with the stopper, and Figure 6 is a view similar to that of Figure 5 showing a threaded T modified somewhat over that of Figure 5.

Referring first to Figures 1 and 2, reference numeral 10 designates a main assumed to contain fluid under pressure, having welded thereto in radial relation the cross portion 11 of a T generally designated by the reference numeral 12. Reference numeral 13 designates the stem portion of the T. At its outer end the cross portion 11 is provided with external threads 14 and with internal inwardly projecting threads 15, the threads being right hand. The said cross portion is in communication with the interior of the main through a circular opening 16 formed in known manner, the diameter of the opening being less than the internal diameter of the cross portion 11 so that a generally annular shoulder 17 is present at the base of the T.

In operative arrangement a service line will be welded to the stem 13, a closure plug will be engaged with the threads 15, and a closure cap will be engaged with the threads 14, this all being ordinary practice. Now, if it should become necessary to make repairs beyond the T, the latter must be shut off between the main and the stem 13 and this is accomplished by the new stopper which is generally designated by the reference numeral 18.

The stopper 18 comprises a plug generally designated by the reference numeral 19. The plug includes an externally threaded portion 20 which is engageable with the internal threads 15. Portion 20 has at its outer end a diametrical rib 21 provided with a threaded axial bore or socket 22, the threads being right hand. At its inner end, portion 20 has a cylindrical stem 23 which is received in a tubular portion 24 and secured by a screw 25. At its other end the portion 24 has a coaxial internal constriction providing an annular shoulder 26.

Reference numeral 27 designates a rubber body of generally cylindrical form with a diameter appreciably less than the minimum internal diameter of the T-portion 11 at the threads 15. Body 27 has tapered upper and lower ends engaged in flanged cylindrical end caps 28 and 29 of which the latter, at least, has a diameter greater than that of opening 17, the diameter of both being less than that of the rubber body. The caps and the body are axially pierced to receive a screw 30 which is threaded into the lower cap 29 and held by a cotter pin 31 in a diametrical kerf in the latter. The screw 30 is slidable in cap 28 and slidable and rotatable in the lower constricted portion of tubular portion 24, and has a cylindrical head 32 overlying the shoulder 26. The rubber body with its end caps is thus held in axial association with the plug 19 by a swivel connection, movement of the head 32 inwardly of tubular portion 24 being permitted by the spacing between the head and the inner end of shank 23. Head 32 is desirably provided with a diametrical kerf 33 so that it may be held by a screw driver while the lower cap 29 is threaded to position.

The inserting tool 34, shown in Figures 1 and 3, comprises a stem 35 threaded at its upper end 36 for engagement in the threaded socket in the lower end of the usual boring bar, and is provided just below this threaded portion with a flat sided enlargement engageable by a wrench. The lower end portion of the stem is flattened to provide parallel faces as at 38 and 38' and below this flattened portion the stem has a reduced threaded extremity 39 engageable in the socket 22 of the plug 19. Slidable on the lower flattened portion of the stem is a mating collar 40 which has lower axially projecting lugs 41 and 42 with opposed parallel faces spaced apart a distance slightly greater than the width of rib 21 of plug 19.

The trailing edges of lugs 41 and 42 are tapered up at 43 and 43' to the lower plane 44 of ring 40 from which the lugs depend. A radial pin 45 fixed in stem 35 is receivable in a recess 46 of sleeve 40 to limit movement of the latter toward the threaded extremity 39. In the limit position of the sleeve as determined by pin 45, the lugs 41 and 42 extend alongside the threaded portion 39.

In the use of the apparatus, the cap is removed from the threads 14 of the T and the drilling apparatus, including the gate or other equivalent valve, is applied as shown in the above mentioned patent to Mueller, whereupon the plug may be removed from threads 15. The barrel of the drilling machine, the valve being closed, is now removed and tool 34, with the stopper attached thereto, is substituted for the plug-removing tool. Tool 34 and the stopper are associated by holding sleeve 40 in the retracted position shown in Figure 3 and threading the extremity 39 into socket 22 as far as it will go. Sleeve 40 is now permitted to drop downwardly and the tool is reversely turned relative to the stopper, lugs 41 and 42 riding up on the sides of rib 21 by the camming action of the trailing edges 43 and 43' until the sleeve drops with the lugs 41 and 42 at the sides of rib 21. Right hand rotation of the tool may now be positively imparted to the stopper without any binding in the threaded connection.

The barrel is now remounted, the valve opened, and the stopper lowered into the T. Now by turning the boring bar, plug portion 20 of the stopper will be threaded into the upper end of the T, and after cap 29 has abutted shoulder 17, further rotation of the plug portion 19, driving against the upper end cap, will compress the rubber body 27 and expand it into sealing engagement with the surrounding walls. The drilling machine may now be removed, the cap reapplied to threads 14, and the stopper left in place as long as required.

To remove the stopper a tool which is similar to tool 34 is utilized except that the upper threads will be left hand for engagement with the small socket of the boring bar and the configuration of lugs 41 and 42 will be reversed. As portion 39 is threaded into socket 22, the lugs will ride over the upper edges of rib 21, and when sufficient threaded engagement has been secured, left hand rotation of the boring bar will cause the lugs to engage rib 21 to impart positive unthreading rotation to the plug 19. The rubber body resumes its normal form and after the stopper has been removed the usual plug and cap are reapplied to the upper threads of the T.

In Figure 5 the cross portion 47 of the T is threaded into an opening in the main. Since under these circumstances there will be no shoulder as at 17, Figure 1, the base of the T has fixed therein an annular abutment ring 48 which is engageable by the lower end cap 29. The operation is the same as before.

In Figure 6, instead of providing the lower threaded end of the T with an annular abutment, the base of the T is provided with inwardly projecting pins 49 set in radial perforations in the walls of the T.

It will be understood that the invention is not limited to details of form and arrangement of parts herein disclosed, but that variations in these matters are contemplated under the following claims.

We claim:

1. The combination with a T having its cross portion secured in substantially radial communicating relation to a main, the outer end of said cross portion being internally threaded, and a portion of the main providing a shoulder at the inner end of said cross portion, of a stopper including a rubber body, said stopper being insertable in said cross portion and against said shoulder to position said rubber body between the stem portion of the T and the main, and means threadable in said outer end to compress said rubber body and thereby expand the latter into sealing engagement with the surrounding walls of the T.

2. The combination with a T having its cross portion welded in substantially radial relation to a main and in surrounding relation to an opening in the main, said opening having a diameter smaller than the internal diameter of said cross portion so that the margin of the opening provides a shoulder at the base of said cross portion, the outer end of said cross portion being internally threaded, of a stopper including a rubber body, said stopper being insertable in said cross portion and against said shoulder to position said rubber body between the stem portion of said T and the main, and means threadable in said outer end to compress said rubber body and thereby expand the latter into sealing engagement with the surrounding walls of the T.

3. A stopper of the kind described comprising a plug having a threaded portion and having a portion at one end engageable by a turning tool, said plug also comprising a tubular portion secured in axial alignment to the other end of said threaded portion and having at its end remote from the latter an internal flange, a rubber body aligned with said plug at the flanged end of said tubular portion, end caps for said body, a pin extending through said caps and body, and means holding the outer end cap on the pin, the pin being slidable relative to the inner end cap and slidable and rotatable in the flanged end of said tubular portion and having a head rotatable in said tubular portion inwardly of said flange.

4. A stopper according to claim 3 wherein the portion engageable by a turning tool is constituted by a diametrical rib provided with a threaded axial bore.

5. For use with a T having its cross portion secured in substantially radial communicating relation to a main and adapted to have associated therewith a valved barrel carrying a rotatable and axially displaceable bar, the outer end of said cross portion being threaded and there being an abutment inwardly beyond the stem portion of the T, a stopper insertable in said cross portion and including a rubber body, said stopper including a plug portion swiveled at one end to said body, means for forming a joint between the other end of said plug and said bar whereby the stopper is held in alignment with said bar and the bar will drive the plug in one direction of rotation but will separate from it in the other, said means for forming a joint including a diametrical rib on said other end of said plug and a threaded axial bore in said rib, said plug being threaded and being engageable with said threaded outer end in said one direction of rotation whereby to compress said rubber body between the plug and said abutment so that the body is expanded transversely.

6. The combination with a T having its cross portion welded in substantially radial communicating relation to a main, the outer end of said cross portion being internally threaded, and a portion of the main at the base of the T providing a shoulder at the inner end of said cross portion, of a stopper including a rubber body, said stopper being insertable in said cross portion and against said shoulder to position said rubber body between the stem portion of the T and the main, and means threadable in said outer end to compress said rubber body and thereby expand the latter into sealing engagement with the surrounding walls of the T.

WALTER J. BOWAN.
ELMER H. FAWLEY.